(12) United States Patent
Jin et al.

(10) Patent No.: US 9,056,621 B1
(45) Date of Patent: Jun. 16, 2015

(54) FOLDING TROLLEY

(71) Applicant: Xugang Jin, Jinhua, Zhejiang (CN)

(72) Inventors: Xugang Jin, Zhejiang (CN); Xuping Xu, Zhejiang (CN)

(73) Assignee: Xugang Jin, Jinhua (CN)

( * ) Notice: Subject to any disclaimer, the term of this patent is extended or adjusted under 35 U.S.C. 154(b) by 0 days.

(21) Appl. No.: 14/147,598

(22) Filed: Jan. 6, 2014

(30) Foreign Application Priority Data

Dec. 4, 2013 (CN) .......................... 2013 1 0648758

(51) Int. Cl.
*B62B 3/02* (2006.01)
(52) U.S. Cl.
CPC ...................................... *B62B 3/027* (2013.01)
(58) Field of Classification Search
CPC ............ B62B 3/02; B62B 3/025; B62B 3/027
USPC ................................................ 280/651, 640
See application file for complete search history.

(56) References Cited

U.S. PATENT DOCUMENTS

| | | | | |
|---|---|---|---|---|
| 1,998,269 | A * | 4/1935 | Brown | 27/27 |
| 2,020,766 | A * | 11/1935 | Brown | 280/639 |
| 2,049,683 | A * | 8/1936 | Baumgardner | 280/640 |
| 6,354,619 | B1 * | 3/2002 | Kim | 280/651 |
| 6,491,318 | B1 * | 12/2002 | Galt et al. | 280/651 |
| 7,731,221 | B2 * | 6/2010 | Bess | 280/651 |
| 8,011,686 | B2 * | 9/2011 | Chen et al. | 280/651 |
| 8,042,819 | B2 * | 10/2011 | Arnold et al. | 280/47.34 |
| 8,162,349 | B1 * | 4/2012 | Roselle | 280/654 |
| 8,388,015 | B2 * | 3/2013 | Chen | 280/647 |
| 8,882,135 | B1 * | 11/2014 | Chen | 280/651 |
| 2010/0090444 | A1 * | 4/2010 | Chen et al. | 280/651 |
| 2011/0204598 | A1 * | 8/2011 | Stevenson | 280/639 |
| 2014/0001735 | A1 * | 1/2014 | Yang et al. | 280/651 |

FOREIGN PATENT DOCUMENTS

CN          1253336 C       4/2006

* cited by examiner

*Primary Examiner* — Jeffrey J Restifo

(57) ABSTRACT

A folding trolley includes a folding trolley frame and a storage pocket. Said trolley frame includes side brackets and a bottom support bracket; said side bracket comprises two cross connecting rods hinged at the central point; said bottom support bracket includes bottom support rods and a central hinged seat. the side bracket is a multi-stage connecting rod structure, including at least two pairs of corresponding hinged connecting rods; the ends of the connecting rods are hinged to form pocket support ends; said storage pocket is provide with downward openings; a pulling member corresponding to the location of said central hinged seat and used for folding the trolley body is provided at the interior bottom of said storage pocket. The trolley can realize convenient fold of the whole body, increase edge strength of the storage pocket, and ease using operation for different users, and has stable structure and larger loading capacity.

8 Claims, 6 Drawing Sheets

FOLDING TROLLEY

CROSS-REFERENCE TO RELATED APPLICATION

This present application claims the benefit of Chinese Patent Application No. 201310648758.1 filed on Dec. 4, 2013; the content of which is hereby incorporated by reference.

FIELD

The present invention relates to a trolley, in particular to a portable folding trolley used for carrying goods.

BACKGROUND ART

Trolley is a small handcart convenient for short-distance transport of a small amount of goods. It is commonly used in daily life, especially for leisure, travel, shopping, goods and delivery, and even used on business trip. The existing portable trolleys are not easy to fold generally, i.e., the size of them is still very large after folding, failing to realize maximum folding, and inconvenient to store and carry.

To solve these problems, the Chinese patent (CN Patent No.: ZL01811289.7) discloses the following technical scheme, wherein there is a optional folding frame; said frame can hold the storage pocket when it is open or in use, forming a rectangle trolley body with an opening on the top; said frame includes sides and underpan array, said side corresponding to the frame includes two connecting rods hinged at the central point, and the end corresponding to each side is provided with a sleeve, pin bolts and vanes to realized rotatable connection; bottom array, or underpan array, includes many support rods and a bearing part basically located at the center of the underpan array; one end of each support rods is hinged with the bearing part, and the other is hinged with the bottom of the connecting rods corresponding to sides; in the process of folding, all the connecting rods and support rods corresponding to each side contract inwardly with the bearing part as the center, and in the process of contraction, the bearing part moves upwards and vertically to realized connection and fold of each side. The folding mode with existing technologies is generally to exert force on each side from outside to inside to make each side close to the bearing part at the center, which is strenuous and inconvenient. The trolley's frame mainly comprises four sides, wherein connecting support rods used for connecting the upper and lower hinged ends of sides are not provided, so this invention can not be used for high-duty support.

In addition, a rivet mechanism is provided at the bottom corners of the storage pocket of the present invention to fix the bottom of the storage pocket and the frame together; the fringe of storage pocket and the upper part of the frame are fastened to realize the fixation of storage pocket; because storage pocket is generally made of soft or flexible materials such as cloth or plastics and only fixed at the ends of frame and four corners, and because the fringe of storage pocket between the two ends keeps in a hanging state for a long term without any support part, the storage pocket is easy to be destroyed due to insufficiency of strength.

Finally, due to limitation of folding structure of trolley frames of the previous patents, the trolley' handle is integrated with the connecting rods, and it is in tilt setting when being used or connected with two ends corresponding to the frame and parallel to frame ends. This handle design has limitations in practical operation. It can not be used by people of different heights; it is convenient to push but can not be pulled.

SUMMARY OF THE INVENTION

In view of the insufficiency of background techniques, the present invention aims at providing a folding trolley, which can realize convenient and easy fold of the whole trolley body, increase the edge strength of the storage pocket, and ease the pushing and pulling operation of trolley for different users. In addition, it has stable structure and larger loading capacity.

In order to realize the above purposes, the present invention provides the following technical scheme: a folding trolley includes a rectangle folding trolley frame with an opening on the top and a storage pocket in the trolley frame; said trolley frame includes 4 side brackets and corresponding bottom support bracket; corresponding wheels are provided at the bottom of the trolley frame; said side bracket comprises two cross connecting rods hinged at the central point; said bottom support bracket includes 4 bottom support rods and a central hinged seat, characterized in that: at least one pair of said side brackets form a multi-stage connecting rod structure; side bracket comprises at least two pairs of corresponding hinged connecting rods; the ends of corresponding connecting rods of each stage are hinged, forming pocket support ends when the trolley frame is unfolded; fixing openings used for catching the pocket support ends are provided at the corresponding storage pocket; the fixing openings face downwards, corresponding to the pocket support ends; pulling member corresponding to the location of said central hinged seat and used for folding the trolley body is provided at the interior bottom of said storage pocket.

Through the above structure setting: the ends of the connecting rods of the multi-stage connecting rod structure are hinged; when the trolley frame is totally unfolded, the corresponding hinged ends can be totally fixed and thus form corresponding pocket support ends, at the time, the downward fixing openings can realize a catching match with pocket support ends, accomplishing multi-end match of the storage pocket ends; meanwhile, pulling member is provided at interior bottom surface of the storage pocket, which can raise the central hinged seat while folding and thus fold bottom support rods, and the corresponding side brackets also finish folding accordingly, which makes the folding operation easier.

The present invention is further set as: corresponding connecting support rods are installed vertically at two neighboring side brackets; the upper and lower ends of connecting support rods are provided with hinged seats suitable for being hinged with connecting rods and bottom support bracket respectively; the connecting support rods are extensible, fixed with the support rod bodies and the extensible support rods of the attachment bracket respectively corresponding to upper and lower hinged seats.

Through the above structure setting: connecting rods corresponding to side brackets are fixed by connecting support rods and their hinged seats; the corresponding extensible support rods move upwards automatically while folding the upper hinged seats to help finish folding. Connecting support rods are added on the basis of existing technologies, which enhances the strength of the whole structure and improves the load capacity.

The present invention is further set as: said trolley also includes push-and-pull rods, which are connected by push-and-pull connecting rods at the center of side brackets; said push-and-pull rods are hinged with corresponding push-and-pull connecting rods on both sides of their rod bodies respectively, and the other ends of the push-and-pull connecting rods are connected with corresponding hinged seats to realize connection and fold of push-and-pull rods.

Through the above structure setting: push-and-pull rods can be folded along with trolley frame to reduce the size of folded trolley body.

The present invention is further set as: many support rods used for supporting roof are provided on the upper surface of the upper hinged seats of said trolley frame; said support rods are fixed on hinged seats with fixing members.

Through the above structure setting: roof used for shading sunlight can be provided on the top of support rods when the trolley is used.

The present invention is further set as: U-shaped support legs are provided between said push-and-pull connecting rods and corresponding hinged seats. Push-and-pull connecting rods are hinged with two sides of U-shaped support legs and the bottom surface of U-shaped support legs is hinged with the hinged seats, realizing swing of push-and-pull rods perpendicular to side brackets.

Through the above structure setting: under normal working condition, push-and-pull rods can swing freely perpendicular to side brackets, and corresponding ends of push-and-pull rods are suited for different operation heights, convenient for different users to push and pull the trolley, so it is flexible.

The present invention is further set as: said fixing members are connected with corresponding hinged seats through fixing holes by sleeve joint, realizing fixation of the end of storage pocket on the trolley frame.

Through the above structure setting: during installation of storage pocket, fixing members can be used to fix 4 corners of storage pocket on the hinged seats by passing through corresponding fixing holes.

The present invention is further set as: a connector used to hinge two push-and-pull rods is fixed on push-and-pull rod body; said connector is placed at the center of the push-and-pull rod.

Through the above structure setting: while folding push-and-pull connecting rods, take the connector as the center; in the process of folding, the connector move upwards like the central hinged seats.

The present invention is further set as: said support rods, fixing members and hinged seats are connected one after another by sleeve joint, and fixing connectors used for fixing support rods are provided at one side of the fixing members.

Through the above structure setting: roof can be adjusted up and down when it is used; the parts below fixing members of support rods are placed in the hollow extensible support rods, and support rods are fixed with fixing connectors.

The present invention is further set as: said push-and-pull rods are multi-stage and extensible, said connecting rods used to fix push-and-pull rods in vertical condition are provided with buckling parts on the connecting rods of side brackets corresponding to push-and-pull rods.

Through the above structure setting: in normal pushing and folding, push-and-pull rods and buckling parts can be used cooperatively to contract the and-pull rods to the shortest state.

The present invention is further set as: said fixing connectors are captured nuts, and screw holes in connection with connecting holes of support rods are provided on sides of fixing members.

Through the above structure setting: if the positions of support rods are determined, they can be fixed by rotating captured nuts.

Meaning of the mark numbers in this figure: 1—storage pocket; 11—fixing opening; 12—pulling member; 13—fixed hole; 2—trolley frame; 21—side bracket; 211—connecting rod; 212—pocket support end; 21A—side bracket; 23—bottom support bracket; 231—support bottom rod; 232—center hinged seat; 24—connecting support rod; 241—support rod body; 242—extensible support rod; 25—upper hinged seat; 26—lower hinged seat; 261—U-shaped hinged seat; 27—fixing member; 271—fixing connector; 272—screw hole; 28—support rod; 29—buckling part; 3—wheel; 4—push-and-pull rod; 41—Connector; 42—push-and-pull connecting rod; 43—U-shaped support leg; 431—side of U-shaped support leg; 432—bottom surface of U-shaped support leg; 5—roof.

THE DETAILED EMBODIMENTS

With reference to the attached figures and examples, specific embodiments of the present invention are described in further detail. The following examples are only used to illustrate the invention, but not intended to limit the scope of the invention.

Figure 1:
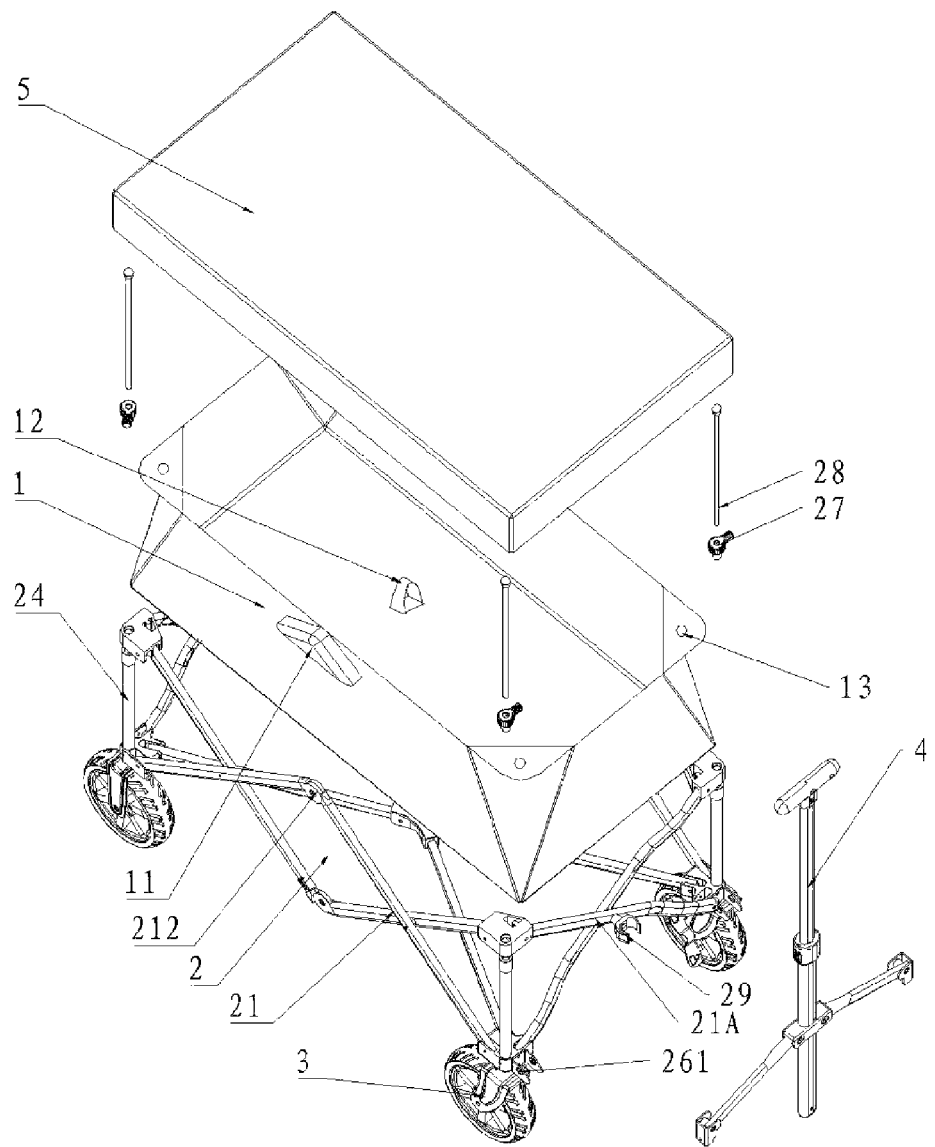
FIG. 1 is space diagram for the decomposition of said trolley parts of the present invention.

Refer to FIG. 1, a folding trolley includes a rectangle folding trolley frame 2 with an opening on the top and a storage pocket 1 in the trolley frame 2. Said trolley frame 2 includes 4 side brackets 21 and corresponding bottom support bracket 23; 4 corresponding wheels 3 are provided at the bottom of the trolley frame 2; said side bracket 21 comprises two cross connecting rods 211 hinged at the central point; said bottom support bracket 23 includes 4 bottom support rods 231 and central hinged seat 232; said side bracket 21 on either side of the trolley frame 2 comprises two cross connecting rods 211 hinged at the center; bottom support bracket comprises 4 bottom support rods 211 and a central hinged seat 232; side bracket 21 on both sides of the trolley frame 2 comprises at least two pairs of corresponding connecting rods 211 hinged at the central part, forming a structure of two-stage connecting rods, namely, 4 connecting rods; the ends of each stage of connecting rods 211 are hinged, forming pocket support ends 212 when the trolley frame 2 is unfolded; fixing openings 11 used for catching pocket support ends 212 are provided at the corresponding storage pocket 1; said downward fixing openings 11 are corresponding to the pocket support ends 212; the interior bottom of said storage pocket 1 is provided with a pulling member 12 corresponding to the position of the central hinged seat 232 and used for folding the trolley body by pulling; the ends of the connecting rods 211 of the multi-stage connecting rod 211 structure are hinged; when the trolley frame 2 is totally unfolded, the corresponding hinged ends can be totally fixed and thus form corresponding pocket support ends 212, at the time, the downward fixing openings 11 can realize a catching match with the pocket support ends 212, accomplishing multi-end match of the storage pocket 1 end and increasing the working strength of storage pocket 1 end; meanwhile, pulling member 12 is provided at interior bottom surface of the storage pocket 1, which can raise the central hinged seat 232 while folding and thus fold bottom support rods 231, and the corresponding side brackets 21 also finish folding accordingly, which makes the folding operation easier.

Said trolley also includes push-and-pull rods 4, which are connected in the central part of side brackets 21A; said push-and-pull rods 4 are hinged with corresponding push-and-pull connecting rods 42 on both sides of their rod bodies respectively; the other ends of the push-and-pull connecting rods 42 are connected with corresponding hinged seats 26 to realize connection and fold of push-and-pull rods 4; push-and-pull rods 4 can be folded with the trolley frame, so as to reduce the size of the whole trolley body.

Figure 2:
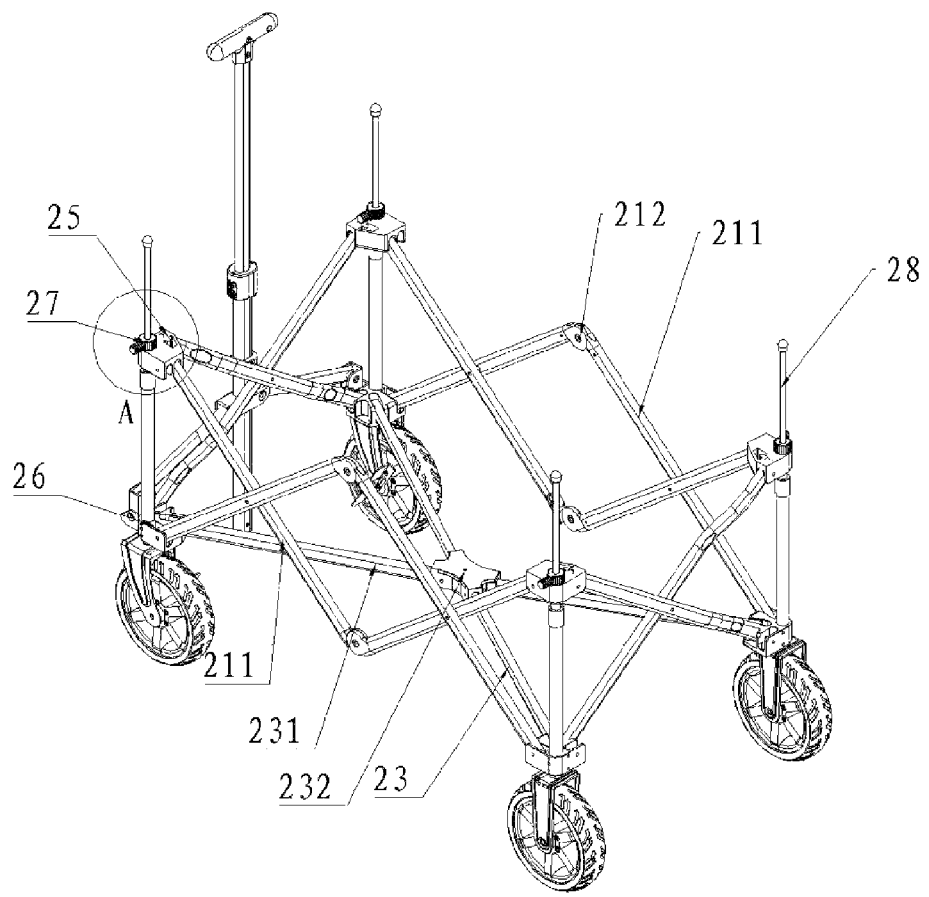
FIG. 2 is schematic diagram for said trolley of the present invention not provided with storage pocket.

As shown in FIG. 1 and FIG. 2, corresponding connecting support rods 24 are installed vertically at two neighboring side brackets; the upper and lower ends of the connecting support rods 24 are provided with matching connecting rods 211 and upper hinged seats 25 and lower hinged seats 26 of fixed bottom support bracket 23 respectively; the connecting rods 24 are extensible, and the upper hinged seats 25 and lower hinged seats 25 corresponding to the upper and lower positions are fixed at support rod bodies and extensible support rods of attachment brackets respectively; the connecting rods 211 corresponding to side brackets 21 are fixed by connecting rods 24 and their upper hinged seats 25 and lower hinged seats 26; the upper hinged seats 25 move upwards automatically corresponding to extensible support rods 242 to help finish folding. Connecting rods 24 are added on the basis of existing technologies, which can enhance the strength of the whole structure and improve the load capacity. Many support rods 28 used for supporting roof 5 are provided on the upper surface of the upper hinged seats 25 of said trolley frame 2; said support rods 28 are fixed on upper hinged seats 25 on the top with fixing members 27. Roof 5 used for shading sunlight can be provided on the top of support rods 28 when the trolley is used.

Said fixing members 27 are connected with corresponding hinged seats 25 through fixing holes 13 of the storage pocket 1 by sleeve joint, realizing fixation of the end of storage bag on the trolley frame 2. During installation of storage pocket 1, fixing members 27 can be used to fix 4 corners of storage pocket 1 on the upper hinged seats 25 by passing through corresponding fixing holes 13 of the storage pocket 1.

Figure 3:
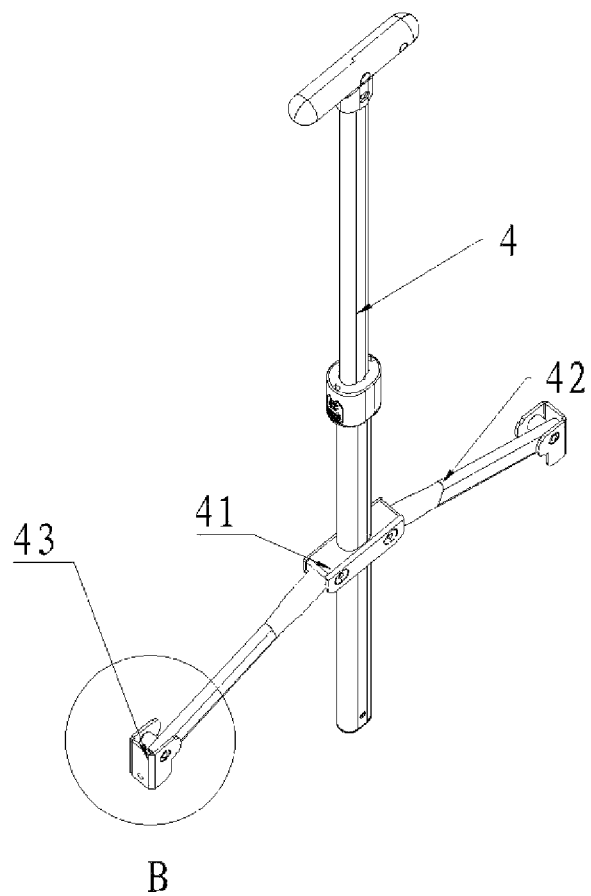
FIG. 3 is schematic diagram for coordination of push-and-pull rods and their push-and-pull connecting rods in the present invention.
Figure 5:
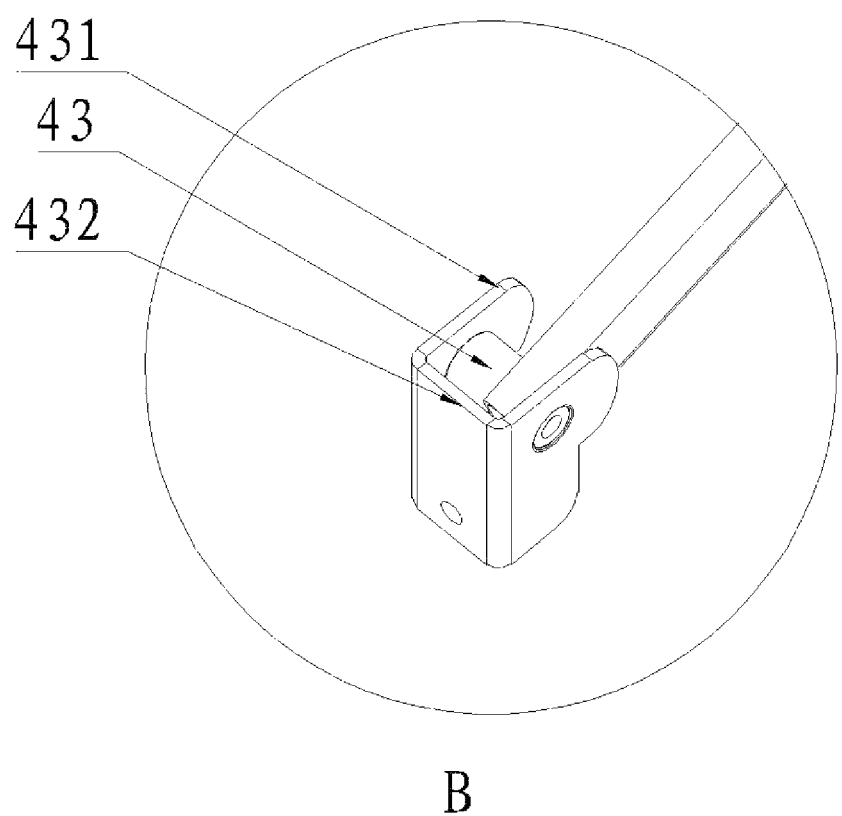
FIG. 5 is partial enlargement of FIG. 2 at point B.

Refer to FIG. 1, FIG. 3, and FIG. 5: U-shaped support legs 43 are provided between said push-and-pull connecting rods 42 and corresponding lower hinged seats 26; push-and-pull connecting rods 42 are hinged with two sides of U-shaped support legs 432; the bottom surface of U-shaped support legs 432 is hinged with the U-shaped hinged seats 261 of lower hinged seats 26, realizing swing of push-and-pull rods perpendicular to side brackets 21A. Under normal working condition, push-and-pull rods 4 can swing freely perpendicular to side brackets 21A, and corresponding ends of push-and-pull rods 4 are suited for different operation heights, convenient for different users to push and pull trolleys, so it is flexible.

A connector 41 used for hinging two push-and-pull connecting rods 42 are fixed on the body of push-and-pull rod 4; said connector 41 is placed at the center of the push-and-pull rods 4. While folding push-and-pull connecting rods 42, take connector 41 as the center; in the process of folding, connector move upwards like the central hinged seat 232.

Said push-and-pull rods 4 are multi-stage and extensible. Said connecting rods 211 are provided with buckling parts 29 used to fix push-and-pull rods 4 in vertical condition on the side brackets 21A corresponding to push-and-pull rods 4. In normal pushing and folding, push-and-pull rods 4 and buckling parts 29 can be used cooperatively to contract the and-pull rods 4 to the shortest state.

Figure 4:
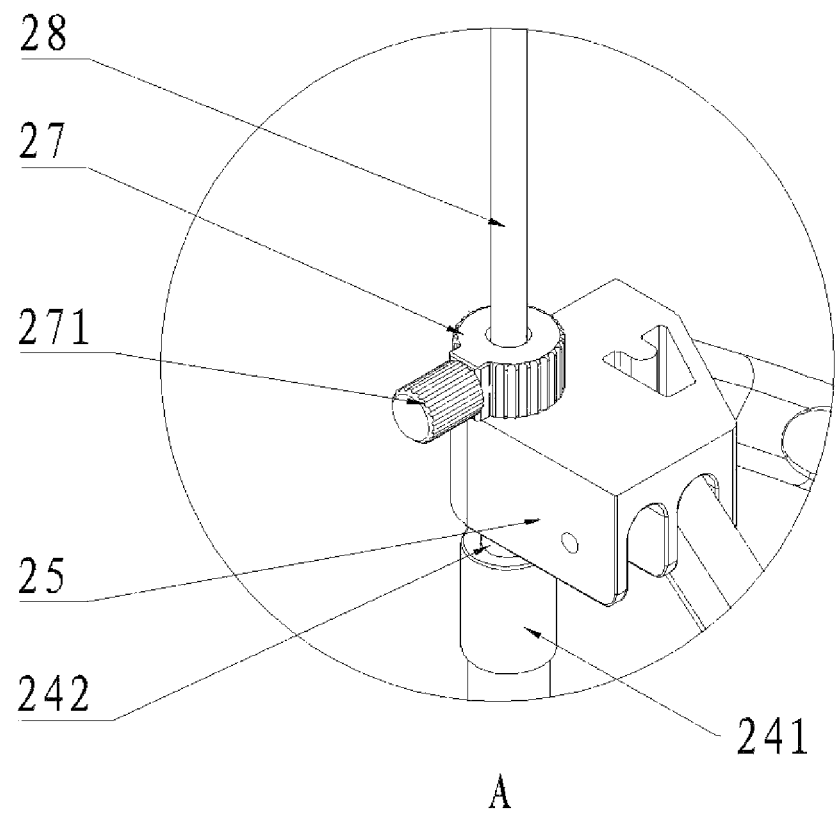
FIG. 4 is partial enlargement of FIG. 2 at point A.
Figure 6:
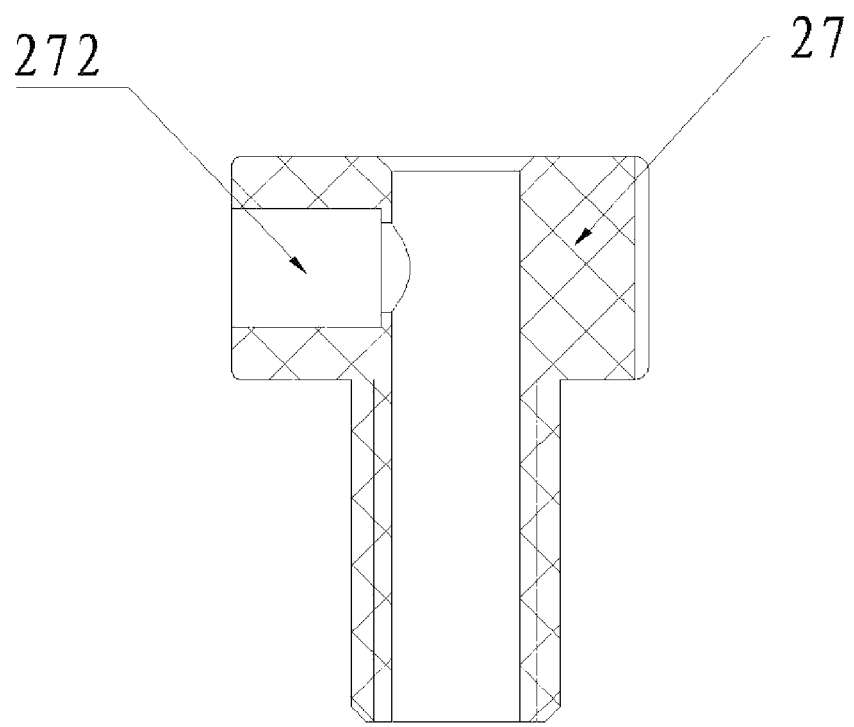
FIG. 6 is schematic diagram for fixing connectors of the present invention.

Refer to FIG. 4 and FIG. 6, said support rods 28, fixing members 27 and hinged seats 25 are connected one after another by sleeve joint, and fixing connectors 271 used for fixing support rods 28 are provided on sides of the fixing members 27. Roof 5 can be adjusted up and down when it is used, the parts below fixing members 27 of support rods 28 are placed in the hollow extensible support rods 242 and support rods 28 are fixed with fixing connectors 271. Said fixing connectors 271 are captured nuts, and screw holes 272 in connection with connecting holes of support rods 28 are provided on sides of fixing members 27. If the positions of support rods 28 are determined, they can be fixed by rotating captured nuts.

The above cases are only preferred embodiments of the present invention. It should be noted that: for persons of ordinary skill in the art can also make a number of modifications and improvements without departing from the technical principle of the present invention. These modifications and improvements shall be considered as within the scope of the invention.

What is claimed is:

1. A folding trolley, comprising a rectangle folding trolley frame with an opening on the top and a storage pocket in the trolley frame; said trolley frame comprises four side brackets and corresponding bottom support bracket; corresponding wheels are provided at the bottom of the trolley frame; said side bracket comprises two cross connecting rods hinged at the central point; said bottom support bracket comprises four bottom support rods and a central hinged seat; corresponding connecting support rods are installed vertically at two neighboring side brackets; the upper and lower ends of connecting support rods are provided with hinged seats suitable for being hinged with connecting rods and bottom support bracket respectively; the connecting support rods are extensible, and the corresponding upper and lower hinged seats are fixed with the support rod bodies and extensible support rods of the attachment brackets respectively; many support rods used for supporting roof are provided on the upper surface of the upper hinged seats of said trolley frame; said support rods are fixed on hinged seats with fixing members; wherein said fixing members are connected with corresponding hinged seats through fixing holes by sleeve joint, realizing fixation of the end of the storage pocket on the trolley frame.

2. A folding trolley as claimed in claim 1, wherein said support rods, fixing members and hinged seats are connected one after another by sleeve joint, and fixing connectors used for fixing support rods are provided at one side of the fixing members.

3. A folding trolley as claimed in claim 2, wherein said fixing connectors are captured nuts, and screw holes in connection with connecting holes of support rods are provided on sides of fixing members.

4. A folding trolley as claimed in claim 3, wherein at least one pair of said side brackets form a multi-stage connecting rod structure; side bracket comprises at least two pairs of corresponding hinged connecting rods; the ends of corresponding connecting rods of each stage are hinged, forming pocket support ends when the trolley frame is unfolded; fixing openings used for catching pocket support ends are provided at corresponding storage pocket; the fixing openings face downwards, corresponding to the pocket support ends; pulling member corresponding to the location of the central hinged seat and used for folding the trolley body is provided at the interior bottom of said storage pocket.

5. A folding trolley as claimed in claim 4, wherein said trolley further comprises push-and-pull rods, which are connected at the center of side brackets; said push-and-pull rods are hinged with corresponding push-and-pull connecting rods on both sides of their rod bodies respectively, and the other ends of the push-and-pull connecting rods are connected with corresponding hinged seats to realize connection and fold of push-and-pull rods.

6. A folding trolley as claimed in claim 5, wherein U-shaped support legs are provided between said push-and-pull connecting rods and corresponding hinged seats; push-and-pull connecting rods are hinged with two sides of U-shaped support legs and the bottom surface of U-shaped support legs is hinged with the hinged seats, realizing swing of push-and-pull rods perpendicular to side brackets.

7. A folding trolley as claimed in claim 6, wherein a connector used for hinging two push-and-pull rods is fixed at push-and-pull rod body; said connector is placed at the center of the push-and-pull rod.

8. A folding trolley as claimed in claim 7, wherein said push-and-pull rods are multi-stage and extensible; said connecting rods are provided with buckling parts used for fixing push-and-pull rods in vertical condition on the connecting rods of side brackets corresponding to push-and-pull rods.

\* \* \* \* \*